J. W. STEPHENSON.

TRACK FASTENING.

APPLICATION FILED APR. 29, 1913.

Reissued June 3, 1913.

13,570.

3 SHEETS—SHEET 1.

Witnesses:
Raphael Netter
R. E. Long

Inventor
John W. Stephenson
By his Attorney
Clarence A. Flint

J. W. STEPHENSON.

TRACK FASTENING.

APPLICATION FILED APR. 29, 1913.

Reissued June 3, 1913.

13,570.

3 SHEETS—SHEET 2.

Witnesses:
Raphael Netter
R. E. Lang.

Inventor
John W. Stephenson
By his Attorney
Clarence Steel

J. W. STEPHENSON.

TRACK FASTENING.

APPLICATION FILED APR. 29, 1913.

Reissued June 3, 1913.

13,570.

3 SHEETS—SHEET 3.

Witnesses:
Raphael Netter
H. E. Long

Inventor
John W. Stephenson
By his Attorney
Clarence E. Stevens

UNITED STATES PATENT OFFICE.

JOHN W. STEPHENSON, OF TOLEDO, OHIO, ASSIGNOR TO THE NATIONAL MALLEABLE CASTINGS COMPANY, OF CLEVELAND, OHIO, A CORPORATION OF OHIO.

TRACK-FASTENING.

13,570. Specification of Reissued Letters Patent. Reissued June 3, 1913.

Original No. 1,010,971, dated December 5, 1911, Serial No. 609,507. Application for reissue filed April 29, 1913. Serial No. 764,416.

*To all whom it may concern:*

Be it known that I, JOHN W. STEPHENSON, of Toledo, county of Lucas, State of Ohio, have invented a new and useful Improvement in Track-Fastenings, of which the following is a full, clear, and exact description, reference being had to the accompanying drawings, forming part of this specification, in which—

Figure 1:
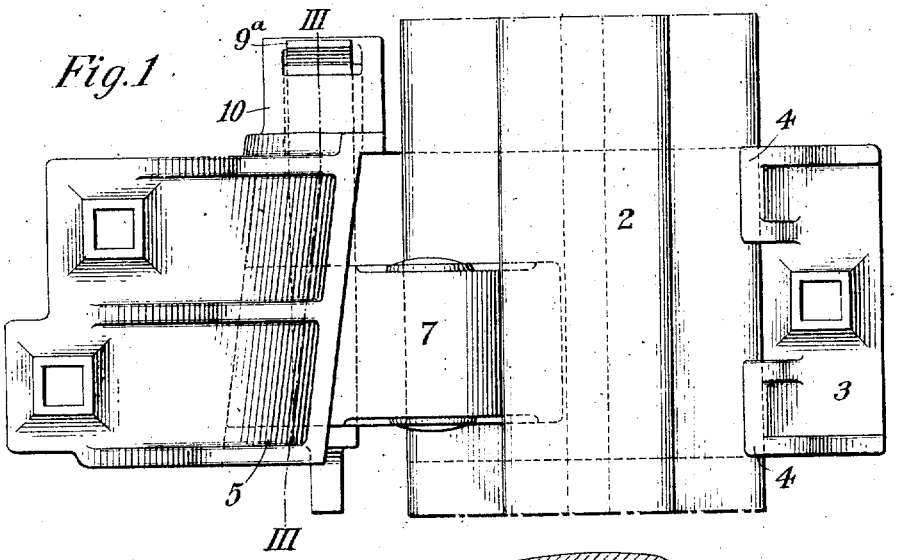
Figure 2:
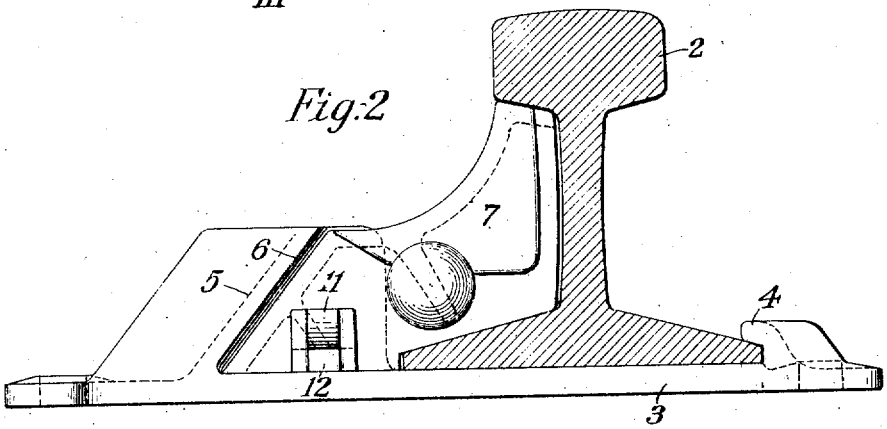
Figure 3:
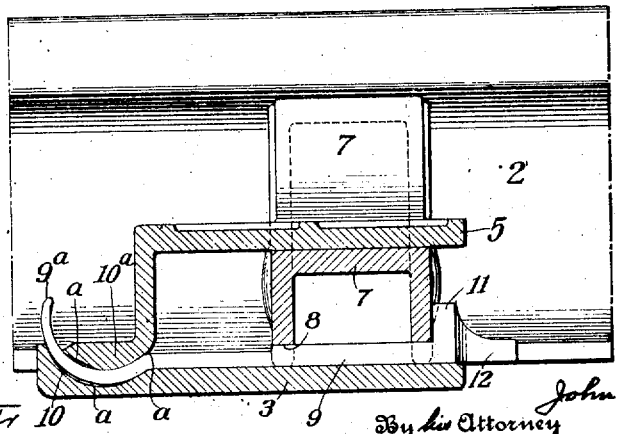
Figure 4:
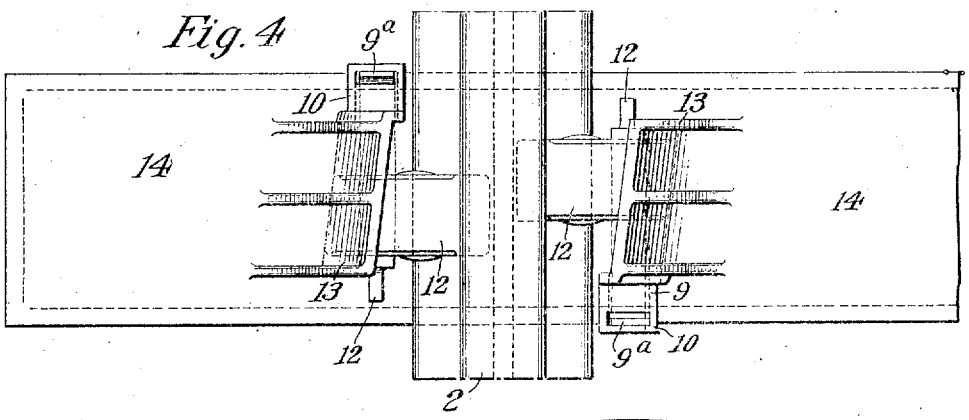
Figure 5:
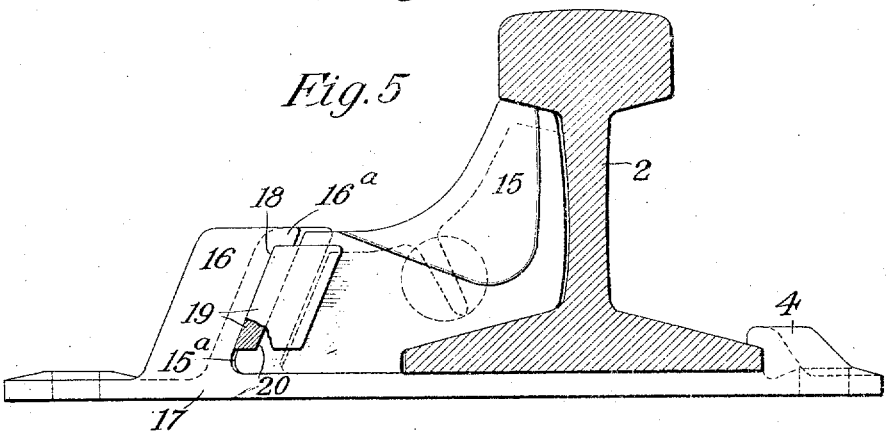
Figure 6:
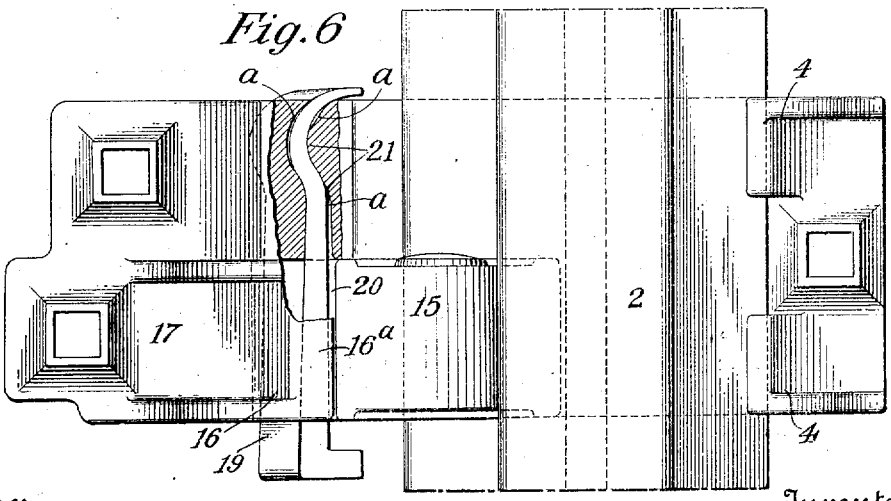
Figure 7:
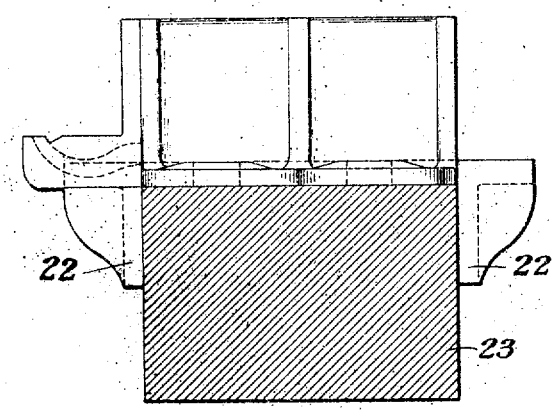
Figure 8:
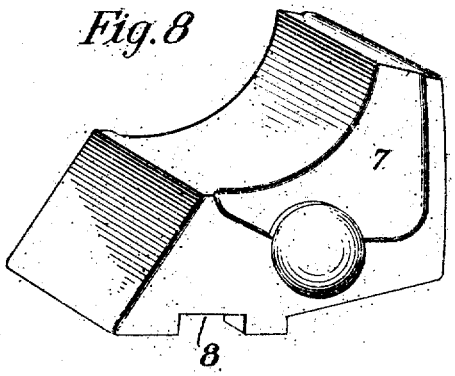
Figure 9:
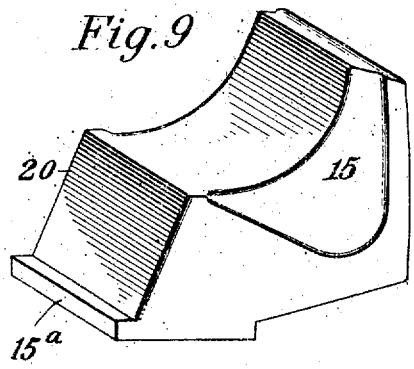
Figure 10:
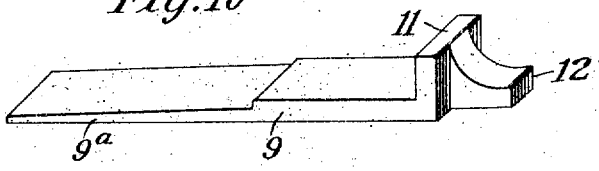

Figure 1 is a plan view showing one form of my invention as applied to a rail brace; Fig. 2 is a sectional elevation of the same; Fig. 3 is a section on the line III—III of Fig. 1; Fig. 4 is a plan view showing the invention applied to a double rail brace arrangement; Fig. 5 is a view similar to Fig. 2, but partially broken away and also showing a modification; Fig. 6 is a plan view partly broken away of the modification shown in Fig. 5; Fig. 7 is a side view of a modified form of tie plate applied to a wooden tie, the latter being shown in cross section; Fig. 8 is a perspective view of the rail brace of Figs. 1, 2, 3 and 4; Fig. 9 is a perspective view of the rail brace of Figs. 5 and 6; and Fig. 10 is a perspective view of the key shown in Figs. 1, 2, 3 and 4.

My invention has relation to track fastenings, and is designed to provide means of simple, positive and effective character for securing the track members in position.

My invention is applicable as a fastening for rail braces, rail joint members and other like devices, either to a tie plate, or a metal tie or other support. The fastenings which have heretofore been provided for this purpose have not proven satisfactory in use for the reason that they either work loose and become ineffective in service or if of such a character as to prevent this, the ordinary track laborer can not be depended upon to see that they are correctly applied in the first instance. It is manifestly of great importance that a fastening of this kind should be positive and secure without the possibility of its working loose and also that it shall be of a character such that the ordinary track laborer will be compelled by the very nature of the device to correctly apply it in the first instance. My invention is designed to provide a fastening of this character.

Referring first to the form of my invention which is shown in Figs. 1, 2 and 3, the numeral 2 designates a portion of an ordinary track rail, and 3 a tie plate which is adapted to be spiked or otherwise secured in any usual manner to the ordinary wooden tie. This tie plate is formed at one side of the rail 2 with one or more lips or projections 4, for engagement with one edge portion of the base flange or foot of the rail. At the opposite side, it is provided with an upwardly extending projection 5, which in this form of my invention has an undercut inner bearing face 6, which face is also inclined longitudinally with respect to the rail. 7 designates a rail brace which is designed to be driven between the undercut inclined face and the web of the rail in the manner shown in Fig. 2, so as to have a secure bracing and supporting engagement with the rail. This brace member is formed on its under side, as best shown in Fig. 8, with a groove or keyway 8, which is designed to receive a key 9, which is preferably of the form shown in detail in Fig. 10. The tie plate, at the opposite end of the projection 5 from that at which the brace member is inserted and driven, is also formed with a guideway 10 for the key, said guideway being in longitudinal alinement with the guideway 8, but being curved downwardly and thence upwardly through the upper surface of the plate at the edge portion thereof. The key is of wrought metal capable of bending. After the brace member has been inserted and driven firmly to its seat, the key is inserted in the guideway and is driven through into the guideway 10. The inner end portion $9^a$ of the key is preferably tapered, as shown in Fig. 10, and when the end of this tapered portion strikes the upper curved wall $10^a$ of the guideway 10, it is deflected downwardly through said guideway and thence upwardly and outwardly, as shown in Fig. 3. This bending and deflection of the key forms a secure clencher engagement of a character which will prevent the key working loose and which will hold the brace member in its driven position. In order that any subsequent looseness, due to wear or other causes may be taken up, the guideway 10 is provided with clearance at the points *a* so that the key may be driven still farther therethrough. The upper bent end of the key may be left in its bent position or a portion thereof may be cut off.

The key 9 may be of various forms, that shown in Fig. 10 being a preferred form for use with a brace member and tie plate such as shown in Figs. 1, 2 and 3. I preferably provide its driving end with an upturned lip 11, having a projecting driving heel 12. This heel will prevent bending of the lip 11 in driving and will insure the lip having a good bearing against the brace member when driven to its seat.

In Fig. 4, I have shown my invention applied to a construction in which there is a brace member 12 at each side of the rail, these brace members being driven in opposite directions between the undercut inclined bearing faces of the upward projections 13 and the web of the rail. The brace members are secured by keys 9 of the same form and in the same manner as in Figs. 1, 2 and 3. Fig. 4 also illustrates the application of my invention to a case where the projections 13 together with the keyways are formed integrally with a metallic tie 14.

Figs. 5 and 6 show a modification of the invention in which a brace member 15, similar to the brace member 7, above described, is seated between the web of the rail and an upward projection 16 of a tie plate 17. The projection 16 has an undercut inner bearing face 18, which is not inclined to the rail as in the forms before described, but extends in a line substantially parallel with the rail. 19 is a key, which is generally similar to the key before described, but which, instead of being driven through a guideway in the bottom of the brace member is driven between the inclined bearing face 20 of the brace member and the inner face 18 of the projection 16. The tie plate is formed with a curved guideway 21 for this key, which is similar to the guideway 10, before described, except that it is arranged in a vertical plane instead of a horizontal plane. In this form of the invention, the brace member is inserted loosely between the web of the rail and the projection 16, and the key is then put in place and driven. As the key is driven, it forces the brace member tightly to its seat. The end of the key in passing through the keyway 21, is bent and clenched in the manner before described and as shown in Fig. 6. The key in this form is preferably tapered throughout its length, so as to exert a continuous wedging engagement against the brace member. The key may be guided and also held against vertical movement by an overhanging lip 16[a] at the upper end of the projection 16, and by the lip or flange 15[a] on the brace member.

The fastening described also acts as an anticreeper for the rails, since the brace member may be so tightly driven and secured as to effectually prevent creeping movement of the rails. If desired, however, particularly for use with rails upon which there is travel in both directions, the tie plate may be formed with downward projections 22, to engage the tie 23, as shown in Fig. 7, these lugs or projections forming a further safeguard against creeping of the rails.

As above stated, when the key is inserted and driven in the manner described, it forms a secure and positive fastening which can not jar or work loose. Furthermore, the proper initial application of the fastening is secured, since all that the laborer is required to do is to insert the key and drive it as far as it will go. If it becomes necessary at any time to remove the fastening, this can be done by sledging the brace member in the opposite direction from that in which it is driven. This will force the clenched end of the key out of the curved guideway and release the fastening.

As above stated, my invention is not limited in its application to securing rail braces, but is applicable to other track members. For instance, it is equally adapted to securing rail joint members. Nor is my invention limited to the particular form of brace members nor the particular form of holding projections which I have illustrated.

I claim:

1. In railway track construction, a base member, a rail engaging member, and a separate bendable key member arranged to hold the engaging member, said key member being driven longitudinally of the rail and into a curved deflecting channel or passage in the base member; substantially as described.

2. In railway track construction, a base member, a rail engaging member, and a bendable key member, driven longitudinally of the rail, the base member having an inclined deflecting channel or passage to receive and deflect the end portion of the key member, substantially as described.

3. In railway track construction, a base member, a rail engaging member, and a bendable key member, driven longitudinally of the rail, the said base and rail engaging members having between them a seat for the key, and the base member also having a deflector to engage and bend the entire end portion of the key member; substantially as described.

4. In railway track construction, a base member, a rail engaging member, and a bendable key member, driven longitudinally of the rail and into an inclined deflecting channel or passage in the base member, said key having a tapered portion; substantially as described.

5. In railway track construction, a base member having an abutment, a rail engaging member between the abutment and the rail, and a bendable key member driven longitudinally, the base member having a curved deflecting opening or passage at one end portion of the abutment; substantially as described.

6. In railway track construction, a base member, a rail engaging member, and a bendable key member driven longitudinally of the rail and into a curved deflecting channel or passage in the base member; substantially as described.

7. In railway track construction, a base member, a rail engaging member, and a bendable key member driven longitudinally of the rail and into a curved deflecting channel or passage in the base member provided with clearance enlargements; substantially as described.

8. In railway track construction, a base member, a rail engaging member, and a bendable key member, driven longitudinally of the rail, and into an inclined deflecting channel or passage formed in the base member and open at both its ends; substantially as described.

9. In railway track construction, a base member, a rail engaging member, and a bendable key member, driven longitudinally of the rail, and into an inclined deflecting channel or passage in the base member, said key member being of broad flat form and having a driving head; substantially as described.

10. In a track fastening, a plurality of wedging members adapted to be driven longitudinally of the rail relatively to each other into clamping engagement with the rail, and automatically bendable locking means adapted to be driven into a curved deflecting channel on one of said members for locking said members in wedging engagement.

11. In a track fastening, a plurality of members adapted to be moved relatively to each other longitudinally of the rail into wedging engagement with each other to clamp the rail, and a separate key having a shoulder and a bendable portion, said key being adapted when driven up to its shoulder against one of said members to be automatically bent and locked to hold said members in wedging engagement.

12. In a track fastening, a plurality of wedging members adapted to be driven longitudinally of the rail relatively to each other into clamping engagement with the rail, and automatically bendable locking means adapted to be driven into a curved deflecting channel provided with clearance enlargements, on one of said members, for locking said members in wedging engagement.

13. In railway track construction, a base member, a wedge member adapted to be driven longitudinally of the rail toward a curved deflecting channel fixed relatively to the base member to clamp the base member to the rail, and a separate bendable key member arranged to be driven longitudinally of the rail and bent in the curved deflecting channel to hold the wedge member in wedging position.

In testimony whereof, I have hereunto set my hand this 17th day of April, 1913.

JOHN W. STEPHENSON.

Witnesses:
CHESTER K. BROOKS,
HARRY J. WARD.